United States Patent [19]
Kos

[11] Patent Number: 5,213,681
[45] Date of Patent: May 25, 1993

[54] METHOD FOR BIOLOGICALLY REMOVING NITROGEN FROM WASTEWATER

[75] Inventor: Peter Kos, Ridgefield, Conn.
[73] Assignee: T. Krüger, Inc., Cary, N.C.
[21] Appl. No.: 756,440
[22] Filed: Sep. 9, 1991
[51] Int. Cl.$^5$ ............................................. C02F 3/30
[52] U.S. Cl. .................... 210/605; 210/610; 210/621; 210/629; 210/903; 210/906
[58] Field of Search ............... 210/605, 607, 610, 614, 210/620–631, 903, 906

[56] References Cited

U.S. PATENT DOCUMENTS

| | | | |
|---|---|---|---|
| Re. 32,429 | 6/1987 | Spector | 210/903 |
| 3,994,802 | 11/1976 | Casey et al. | 210/605 |
| 4,183,809 | 1/1980 | Klapwijk et al. | 210/903 |
| 4,384,956 | 5/1983 | Mulder | 210/903 |
| 4,867,883 | 9/1989 | Daigger et al. | 210/605 |
| 4,948,510 | 8/1990 | Todd et al. | 210/605 |
| 5,022,993 | 6/1991 | Williamson | 210/605 |
| 5,137,636 | 8/1992 | Bundgaard | 210/605 |
| 5,160,043 | 11/1992 | Kos | 210/605 |

*Primary Examiner*—Thomas Wyse
*Attorney, Agent, or Firm*—Rhodes, Coats & Bennett

[57] ABSTRACT

The present invention relates to a system and method for biologically removing nitrogen from wastewater. Both the system and method entails forming a mixed liquor and transferring the mixed liquor to a series of nitrogen removal stages. Each nitrogen removal stage includes both anoxic and aerobic treatment zones. Mixed liquor is recycled back and forth between the anoxic and aerobic treatment zone of each stage. Because of this basic flow scheme, the process gives rise to a high reactor rate and highly efficient nitrogen removal process.

21 Claims, 4 Drawing Sheets

METHOD FOR BIOLOGICALLY REMOVING NITROGEN FROM WASTEWATER

FIELD OF THE INVENTION

The present invention relates generally to activated sludge systems for the treatment of waste water and more particularly to biological nutrient removal processes for removing nitrogen and phosphorus from wastewater.

BACKGROUND OF THE INVENTION

The eutrophication of lakes, rivers and other water resources is receiving worldwide attention. The presence in the environment of nutrients, such as phosphorus and nitrogen is one of the primary causes of eutrophication. These nutrients promote unwanted growth of algae and other aquatic plants which consume dissolved oxygen. In some instances, dissolved oxygen levels are reduced beyond the level needed to sustain fish and other animal life.

The eutrophication of our lakes and rivers has led to increased demands for nutrient control in the wastewater treatment plants. Governmental agencies have enacted increasingly stringent regulations controlling the amount of nutrients which can be discharged into receiving waters. Since conventional treatment processes remove only small amounts of nitrogen and phosphorus, wastewater treatment plants will be required to change or modify their processes to meet these increasingly stringent regulations. Unfortunately, the technology to achieve the required removal efficiencies is lagging behind regulatory requirements.

One approach for accomplishing nutrient removal is biological treatment in a modified activated sludge system without chemical addition. Numerous biological nutrient removal processes have been developed. These biological nutrient removal processes typically use a single sludge configuration in which the organic matter of the influent is used as the carbon and energy source for nitrogen and phosphorus removal. This allows for lower operating cost in comparison to multiple sludge systems and other physical-chemical systems.

One of these biological nutrient removal process which is commonly used is known as the Bardenpho Process. The Bardenpho Process consists of an initial anaerobic contact zone followed by four alternating stages of anoxic and aerobic conditions. In the anaerobic zone, all of the raw wastewater is mixed with the return sludge. The anaerobic conditions in the initial contact zone is necessary to effect phosphorus removal. The first anoxic zone follows the anaerobic zone. Nitrates and nitrites ($No_x$) are supplied to the anoxic zone by recycling nitrified mixed liquor from the following aerobic zone. The organic material in the raw wastewater is used as a carbon source by the denitrifying bacteria in the denitrification zone. The first aerobic (oxic) zone is followed by a second anoxic zone where any remaining nitrites in the mixed liquor are reduced by the endogenous respiration of the activated sludge. The final stage is aerobic where the mixed liquor is reaerated before reaching the final clarifier. The dissolved oxygen of the wastewater effluent is increased to prevent further denitrification in the clarifier and to prevent the release of phosphates to the liquid in the clarifier.

The Bardenpho Process is capable of achieving a high percentage of nitrogen compound removal as well as phosphorus removal. However, the Bardenpho Process requires substantially larger tank volumes than conventional activated sludge systems which means higher capital outlays. Additionally, the Bardenpho System relies on endogenous respiration in the second anoxic reactor which is a relatively slow process. Thus, its use is limited to small plants.

Another biological nutrient removal process which is frequently used is known in the industry as the AAO Process (or $A^2O$ Process). The $A^2O$ process consists of three treatment zones—anaerobic, anoxic and aerobic. The wastewater and returned sludge are mixed in the first treatment zone which is maintained under anaerobic conditions to promote phosphorus removal. The anaerobic zone is followed by an anoxic denitrification zone. The third treatment zone is an aerobic zone where nitrification of the mixed liquor is achieved. The nitrified mixed liquor is recycled back to the anoxic denitrification zone where the nitrate and nitrite is reduced to elemental nitrogen by denitrifying organisms. The $A^2O$ system has a high rate of nitrogen removal and requires total tank volume comparable to that of conventional activated sludge systems. Thus, the $A^2O$ system is a cost effective system for nutrient removal. However, the $A^2O$ system does not achieve high efficiency of nitrogen removal. The low nitrogen removal efficiency is an inherent limitation of the $A^2O$ process. The maximum theoretical nitrogen removal efficiency can be calculated according to the following formula:

$$C_{NOx} = \frac{TN_{in} - N_B}{1 + \frac{IR}{Q} + \frac{RS}{Q}} = \frac{(TN_{in} - N_R)Q}{Q + IR + RS}$$

where:
$C_{NOx}$—concentration of $NO_3 + NO_2$ in plant effluent (g/l).
$TN_{in}$—Concentration of Total Nitrogen in the influent (g/l).
$N_B$—Concentration of nitrogen removed by ordinary activated sludge process (The nitrogen removed by biomass to generate new cell material.
IR—Mixed liquor internal recycle rate.
Q—Influent flow rate.
RS—Return sludge flow rate.

The equation assumes that there is complete nitrification in the aerobic zone and complete denitrification in the anoxic zone. Further, it is assumed that there is sufficient BOD available for complete denitrification.

In the $A^2O$ system, the sludge recycle rate will typically equal 100% of the inflow, while the internal mixed liquor recycle will equal 200% of the influent flow. Using these values, the concentration of total nitrogen in the effluent would be approximately ¼ of the total nitrogen in the influent. This correlates to a removal efficiency of approximately 75%.

According to the formula, the removal efficiency can be increased by increasing the mixed liquor recycle from the aerobic zone. If, for example, the mixed liquor recycle were increased to 400% of the influent flow, the concentration of total nitrogen in the effluent would equal 1/6 of the total nitrogen in the influent, for a removal efficiency of approximately 83%.

In actual practice, increasing the mixed liquor recycle in excess of 200% of the influent flow does not improve nitrogen removal. As the mixed liquor recycle increases, the recirculated mixed liquor dilutes the soluble BOD in the anoxic zone and thus decreases the rate of denitrification in the anoxic zone. The increased flow also decreases the actual retention time of mixed liquor in the anoxic zone and flushes out soluble BOD into the oxic zone where it is unavailable for denitrification.

Accordingly, there is a need for a biological nutrient removal process which accomplishes high nitrogen removal efficiencies at high reaction rates, which is cost effective, and which minimizes capital outlays required to retrofit conventional activated sludge systems.

SUMMARY AND OBJECTS OF THE INVENTION

The present invention is an activated sludge process which achieves a high rate of nitrogen compound removal and high efficiency of removal. The activated sludge process of the present invention includes multiple nitrogen removal stages, each of which includes an anoxic zone and an aerobic zone. In the aerobic zone, ammonia and organic nitrogen present in the influent are converted by nitrifying organisms into nitrate and nitrite. The nitrified mixed liquor is transferred to the anoxic zone where denitrifying organisms reduce the nitrate and nitrite to elemental nitrogen. From the final nitrogen removal stage, the mixed liquor passes to a clarifier where settled solids are separated from clear effluent. At least a portion of the settled solids are recycled for mixing with the influent wastewater.

In a preferred embodiment of the invention, the nitrogen removal stages are linked through the anoxic treatment zones. In this arrangement, a portion of the mixed liquor in the first anoxic zone is transferred to the first aerobic zone. The remaining portion is transferred to the second anoxic zone. The mixed liquor in the first aerobic zone is recycled back to the anoxic zone. In this arrangement, a greater portion of the influent BOD passes to the second anoxic zone as compared, for instances to the Bardenpho process. As a result, the BOD concentration is greater in the second anoxic zone and consequently, the denitrification rate would be higher.

In another embodiment of the invention, the nitrogen removal stages are linked through the aerobic treatment zones. In this embodiment, the anoxic zones in each stage, except the first stage, is disposed in a closed loop so that the mixed liquor in the anoxic zone must pass back through the aerobic zone before proceeding to the next stage.

The invention may also include an anaerobic treatment zone preceding the first nitrogen removal stage to promote production of non-filamentous sludge containing phosphorus storing microorganisms. The anaerobic stress condition causes conversion of soluble BOD to acetate and other fermentation products which are then assimilated and stored by the phosphorus storing microorganisms. The assimilation of the fermentation products, which is accompanied by the partial release of the stored phosphorus, then makes possible to assimilate and store greater than normal quantities of phosphorus under subsequent aerobic conditions.

To promote further the phosphorus and nitrogen removal, the addition of the fermentation products (from fermenting primary sludge) is used in the practice. In another embodiment of the invention, the fermentation products are added into the settled solids and are allowed to contact for a period of time before remixing with the incoming influent. The fermentation products can also be added directly into the influent or into the anaerobic or anoxic zone.

Based on the foregoing, it is an object of the present invention to provide an improved activated sludge process for removing BOD, nitrogen and phosphorus from an influent wastewater.

Another object of the present invention is to provide an activated sludge process which achieves relatively high reaction rates and high removal efficiencies in a single sludge system.

It is a further object of the present invention to provide an activated sludge process for removing BOD and nutrients from an influent wastewater in which total retention time is comparable to that of a conventional activated sludge system.

It is a further object of the present invention to provide an improved activated sludge process for biologically removing BOD and nutrients from an influent wastewater at a relatively low cost as compared to other biological nutrient removal systems.

Another object of the present invention is to provide an activated sludge process for biologically removing BOD and nutrients from an influent wastewater which requires relatively low capital cost for upgrading conventional activated sludge systems.

Other objects and advantages of the present invention will become apparent and obvious from a study of the following description and the accompanying drawings which are merely illustrative of such invention.

DETAILED DESCRIPTION OF THE INVENTION

Figure 1:
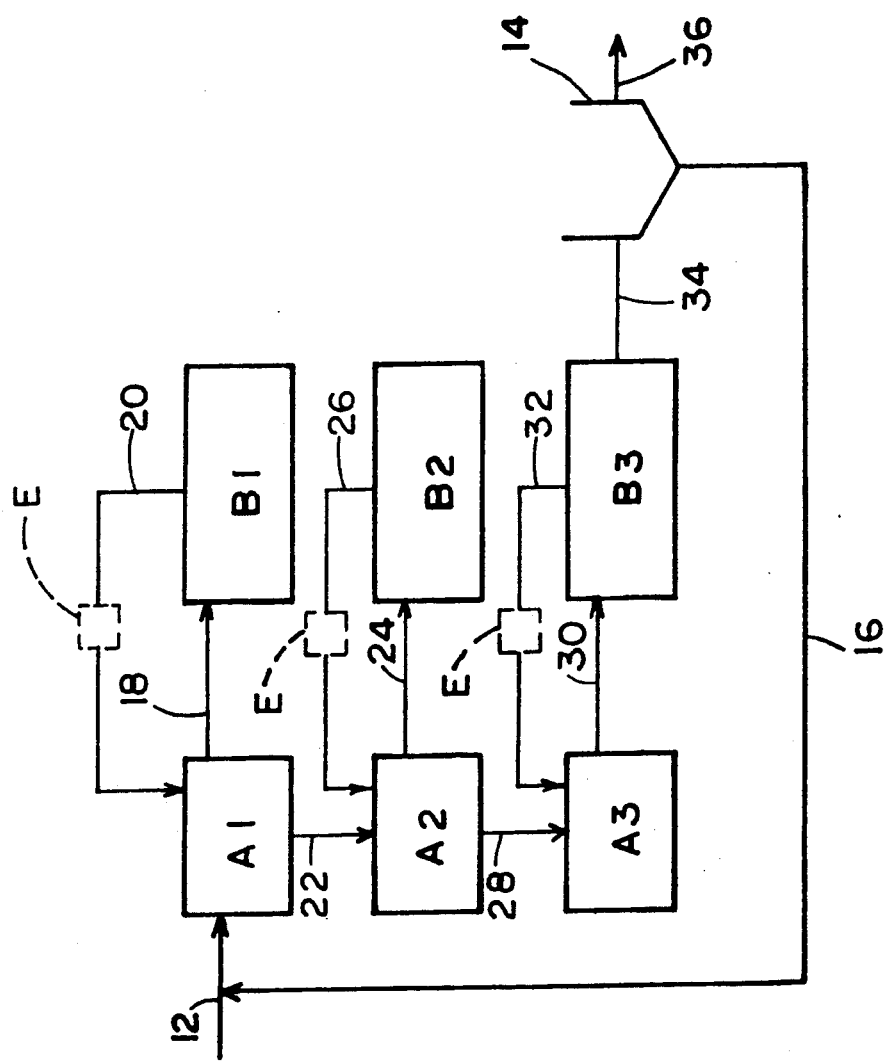
FIG. 1 is a schematic diagram illustrating the basic process steps in accordance with the present invention.

Referring now to the drawings, a modified activated sludge process is shown schematically therein and indicated generally by the numeral 10. The activated sludge system is a single sludge system having three nitrogen removal stages. Each nitrogen removal stage includes an anoxic treatment zone indicated at A1, A2 and A3, and an aerobic treatment zone indicated at B1, B2 and B3. For purposes of this application, the term "anoxic" denotes nonaerated conditions conducive to denitrification. Under anoxic conditions, nitrate or nitrite is primarily used by microorganisms for metabolism and the dissolved oxygen concentration is near zero. The term "anaerobic" denotes a state in which neither dissolved oxygen nor nitrates/nitrites are present and microorganisms primarily utilize energy derived from hydrolysis or polyphosphates for BOD absorption.

Primary effluent from a primary treatment zone (not shown) enters the first stage anoxic zone A1 through line 12 where it is mixed with return activated sludge recycled from a final clarifier 14 to form a mixed liquor. An aerobic treatment zone B1 follows the anoxic treatment zone A1 in the first stage. Mixed liquor flows from the anoxic treatment zone A1 to the aerobic zone B1 through line 18. The aerobic zone B1 is disposed in a closed circulation loop so that the effluent from the aerobic zone B1 returns to the anoxic treatment zone A1 through internal recycle line 20.

Each subsequent nitrogen removal stage includes an anoxic treatment zone, A2 and A3 respectively, followed by an aerobic treatment zone, B2 and B3 respectively. In the second stage, mixed liquor passes from the anoxic zone A2 to the aerobic zone B2 through line 24. The aerobic zone B2 in the second nitrogen removal stage is also in a closed circulation loop so that effluent from the aerobic zone B2 must return back to the anoxic zone A2 through internal recycle line 26. In the third stage, mixed liquor passes from the anoxic treatment zone A3 to the aerobic zone B3 through line 30, and returns back to the anoxic zone through internal recycle line 32.

Each of the nitrogen removal stages are linked in sequential fashion so that the mixed liquor passes sequentially from the first stage through each subsequent stage to the final stage. In the embodiment shown in FIG. 1, the anoxic zones A1, A2 and A3 of each nitrogen removal stage are linked. Mixed liquor passes from the first anoxic stage A1 to the second anoxic stage A2, and from the second anoxic stage A2 to the third anoxic stage A3. In the final treatment stage, the mixed liquor flows from the aerobic treatment zone B3 to the final clarifier 14 through line 34. In the final clarifier 14, the suspended solids are allowed to settle to the bottom of the clarifier. The settled solids are returned through line 16 to the first stage anoxic zone A1. The clear supernatant (effluent or treated wastewater) is sent to receiving streams or reservoirs with or without further treatment.

In operation, ammonia and organic nitrogen in the influent remain unchanged as it passes through the first stage anoxic zone A1 to the aerobic zone B1. In the aerobic treatment zone B1 the mixed liquor is aerated to maintain a dissolved oxygen concentration of at least 0.5 mg/l, and preferably in the range of 2.0 to 4.0 mg/l. Nitrifying organisms convert ammonia and organic nitrogen present in the mixed liquor to nitrate and nitrite ($NO_x$). Uptake of organic mater and phosphorus also occurs.

The nitrified mixed liquor formed in the aerobic zone is recycled back to the first stage anoxic zone A1. In the anoxic treatment zone A1 the mixed liquor is stirred, but not aerated, to keep the solids in suspension and to maintain a thorough contact between the recycled sludge and the influent wastewater. The nitrate and nitrite present in the mixed liquor is used as a terminal electron acceptor by denitrifying organisms and is converted to elemental nitrogen. The nitrogen is released to the atmosphere thereby resulting in nitrogen removal. The rate of recycle is preferably between 100%–200% of the influent flow. Recycle rates in excess of 200% dilute the BOD concentration in the anoxic zone which would reduce reaction rates and impair nitrogen removal.

The internal mixed liquor recycled streams may, if necessary, be provided with a holding tank E where the mixed liquor is held for a period of fifteen to thirty minutes. During this holding period, any dissolved oxygen in the mixed liquor being recycled from the aerobic zone would be exhausted. Accordingly, there would be little, if any, introduction of oxygen into the anoxic zone. By eliminating introduction of oxygen into the anoxic zone, a greater percentage of the influent BOD will be used for denitrification.

The denitrification process described above is repeated in the second and third nitrogen removal stages. The carbon and energy source for denitrification is provided by the BOD contained in the influent wastewater. Because of the novel arrangement, a portion of the influent BOD not absorbed in the first anoxic zone A1 will pass into the second anoxic zone A2 instead of being oxidized in the first aerobic zone B1. Thus, mixed liquor passing from A1 to A2 will include a significant amount of BOD that can be used in A2 for denitrifying purposes. If additional organic matter is needed for denitrification in the second or third stages following the initial stage, it can be provided by introducing fermentation products (from fermenting primary sludge). During the anoxic treatment, BOD is oxidized by the denitrifying bacteria using $NO_x$. Additionally, any BOD penetrating from the anoxic zone to the aerobic zone is absorbed and metabolized by organisms in the aerobic zone. Thus, the present invention combines BOD removal, nitrification, and denitrification into a single sludge, activated sludge process where the sole energy source is provided by the BOD in the influent. The present invention overcomes some of the disadvantages associated with the $A^2O$ and Bardenpho processes. The process of the present invention maintains a relatively high reaction rate in the initial anoxic zone. This is accomplished by keeping the internal mixed liquor recycle in the range of 100%–200% of the total influent flow. Further, greater portions of the influent BOD are made available for denitrification as compared to the $A^2O$ and Bardenpho processes. More particularly, the present invention allows a portion of the influent BOD to flow directly from the first anoxic stage to the second anoxic stage where it can be used by microorganisms for denitrification. Thus, unlike Bardenpho, the present invention does not rely on the endogenous respiration for nitrogen removal in the second anoxic stage. Additionally, the holding tank E in the mixed liquor recycle streams limits introduction of oxygen into the anoxic zone which would tend to interfere with the denitrification process.

Figure 2:
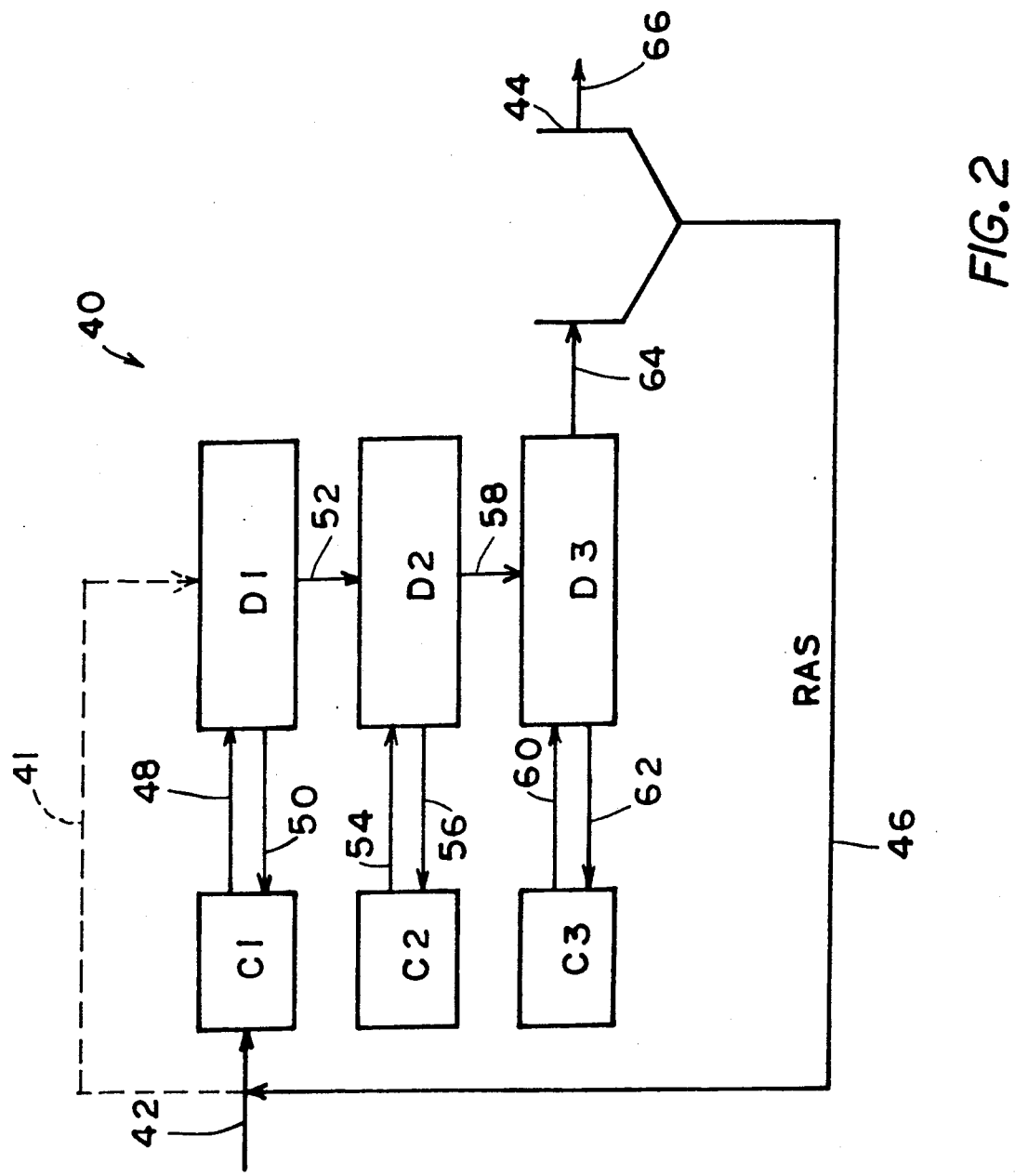
FIG. 2 is a flow diagram illustrating the basic process steps in accordance with a second embodiment of the present invention.

Referring now to FIG. 2, a second embodiment of the present invention is shown and indicated generally at 40. The second embodiment, like the first embodiment includes three nitrogen removal stages. Each nitrogen removal stage includes an anoxic zone indicated at C1, C2 and C3, and an aerobic treatment zone indicated at D1, D2 and D3. Influent flows through line 42 into the first stage anoxic zone C1 where it is mixed with return activated sludge recycled from the final clarifier 44. In the first nitrogen removal stage, mixed liquor passes between the anoxic treatment zone and the aerobic treatment zone through lines 48 and 50 respectively. In the second nitrogen removal stage, the mixed liquor passes between the anoxic treatment zone and the aerobic treatment zone through lines 54 and 56. In the third and final treatment stage, the mixed liquor passes between the anoxic treatment zone C3 and the aerobic treatment zone D3 through lines 60 and 62.

Unlike the first embodiment, the aerobic zones of each treatment stage are linked, rather than the anoxic zones. Thus, mixed liquor passes from the first stage aerobic zone D1 to the second stage aerobic zone D2 through line 52, and from the second stage aerobic zone D2 to the third stage aerobic zone D3 through line 58. After clarification in the final clarifier 44, the settled sludge is returned to the first stage anoxic zone C1 through the return line 46 and the supernatant is discharged into the receiving stream.

In cases where fermentation products or other carbon source is added to the process, the wastewater influent and return sludge could be directly fed to the first aerobic zone D1 of the first nitrogen removal stage. This option is illustrated in FIG. 2. Note dotted line 41 represents both wastewater effluent and return activated sludge being directed into aerobic zone D1.

In operation, the system shown in FIG. 2 is substantially the same as the system shown in FIG. 1. Ammonia and organic nitrogen in the wastewater influent passes through the anoxic zone essentially unaffected. In the aerobic reactor zone, nitrifying organisms convert ammonia and organic nitrogen originally present in the influent to nitrate and nitrite. Uptake of residual organic matter also occurs in this zone. The nitrified mixed liquor is recycled back from the aerobic reactor zone to the anoxic reactor zone where nitrate and nitrite contained in the mixed liquor is reduced by denitrifying microorganisms to elemental nitrogen.

Figure 3:
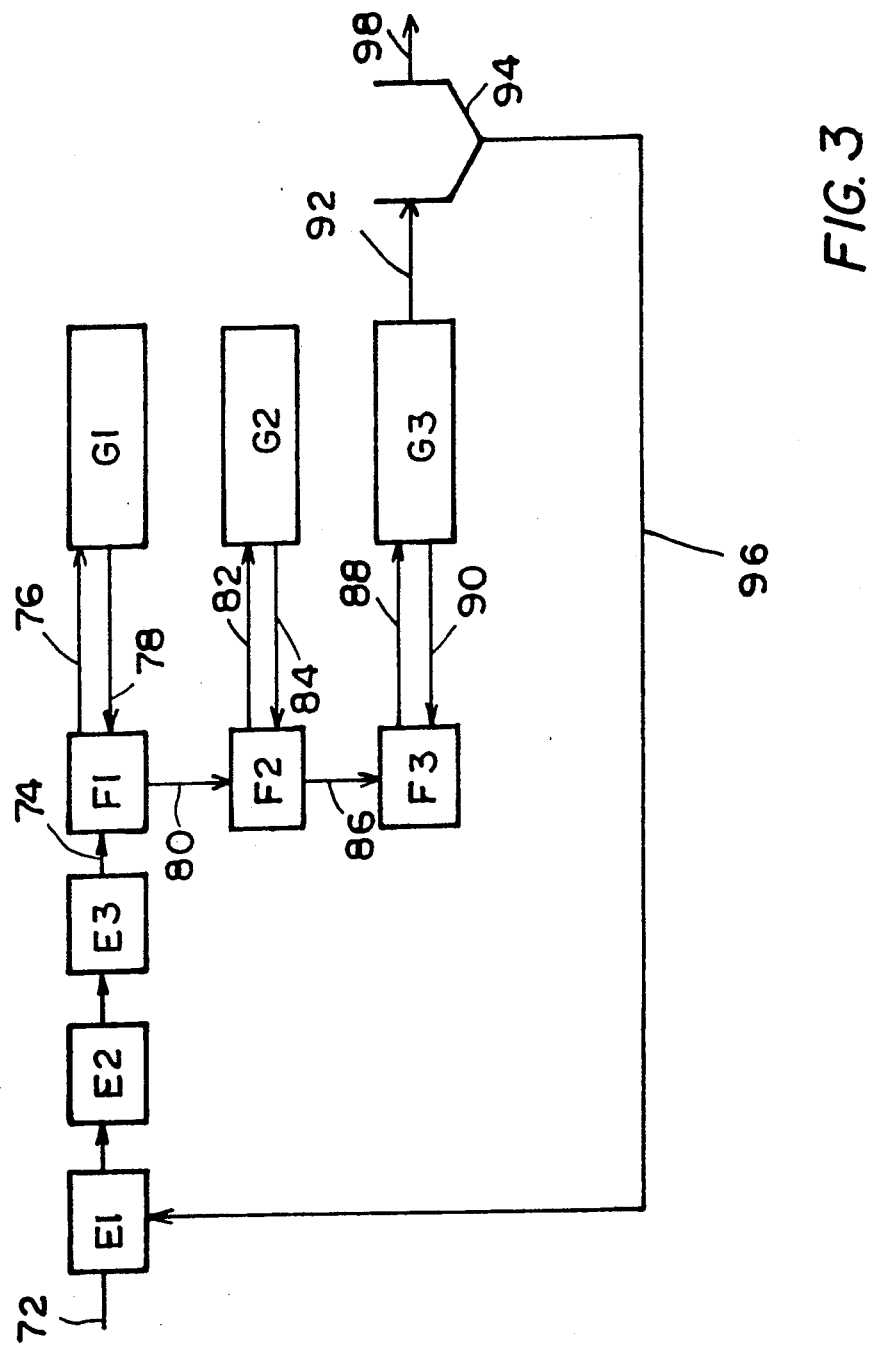
FIG. 3 is a block diagram illustrating the basic process steps in accordance with a third embodiment of the present invention.

In some instances, it will also be desirable to remove phosphates from the influent wastewater. FIG. 3 illustrates an alternate embodiment of the present invention which is designed specifically for removing nitrogen and phosphorus from the influent wastewater. In the embodiment shown in FIG. 3, the influent wastewater is first introduced through line 72 into an anaerobic treatment zone comprising cells E1, E2, and E3. Cells E1, E2, and E3 are hydraulically distincted sections which approximate a plug-flow configuration. The use of a stage reactor configuration would increase the overall rate of phosphorus release because the concentration of organics would be relatively high in the first cell.

After leaving the last cell E3 of the anaerobic zone, the mixed liquor passes to the first one of a plurality of nitrogen removal stages. The nitrogen removal stages in this embodiment are arranged in the same manner as the first embodiment of the invention. Influent from the final cell E3 of the anaerobic zone enters the anoxic zone F1 of the first nitrogen removal stage through line 74. An aerobic treatment zone G1 is disposed following the anoxic zone F1. Mixed liquor flows between the anoxic zone F1 and the aerobic zone G1 through lines 76 and 78 respectively. Mixed liquor also flows from the first stage anoxic zone F1 to the second stage anoxic zone F2 through line 80 and from the second stage anoxic zone F2 to the third stage anoxic zone F3 through line 86. In the second stage, mixed liquor passes between the anoxic zone F2 through line 80 and the aerobic zone G2 through lines 82 and 84. In the third and final treatment zone, mixed liquor passes from the anoxic treatment zone F3 to the aerobic treatment zone G3 through line 88 and returns back to the anoxic zone through line 90. In the final nitrogen removal stage, the mixed liquor flows from the aerobic treatment zone G3 to the final clarifier 94 through line 92. Suspended solids are separated from the supernatant or treated wastewater and returned to the first cell of the anaerobic zone E1 through line 96. The purified supernatant is then sent for further treatment or into a receiving stream.

In operation, the system illustrated in FIG. 3 favors proliferation of phosphorus storing microorganisms. The phosphorus storing organisms can readily assimilate organic matter present in the wastewater influent by hydrolyzing stored polyphosphates to provide energy for BOD absorption. As the organisms absorb BOD, phosphorus is released into the liquid. When the mixed liquor is subsequently aerated, the absorbed BOD is oxidized. The energy of oxidation is utilized by the phosphate storing organisms for cell growth and for uptake of soluble phosphorus in the liquid which may stored as polyphosphates. During the aerobic treatment, the soluble phosphate values in the mixed liquor is rapidly reduced. The phosphorus is then removed from the system by wasting a portion of the sludge from the final clarifier.

To assure that phosphorus is not released in the final clarifier due to anaerobic or anoxic conditions, the dissolved oxygen concentration in the aerobic zone G3 of the final nitrogen removal stage is maintained between 2.0 and 4.0 mg/l. By maintaining a relatively high dissolved oxygen concentration in the final aerobic zone, the occurrence of floating sludge will also be eliminated.

The removal of nitrogen in the third embodiment is accomplished in the same manner as the first two embodiments. The ammonia and organic nitrogen values in the wastewater influent pass through the anaerobic zone untouched. Nitrification of the mixed liquor takes place in the aerobic zones G1-G3, and denitrification of nitrate and nitrite to elemental nitrogen takes place in the anoxic zones F1-F3. Thus, the third embodiment combines BOD removal, nitrogen removal and phosphorus removal into a single sludge, activated sludge process where the sole energy source is provided by the BOD contained in the influent.

Figure 4:
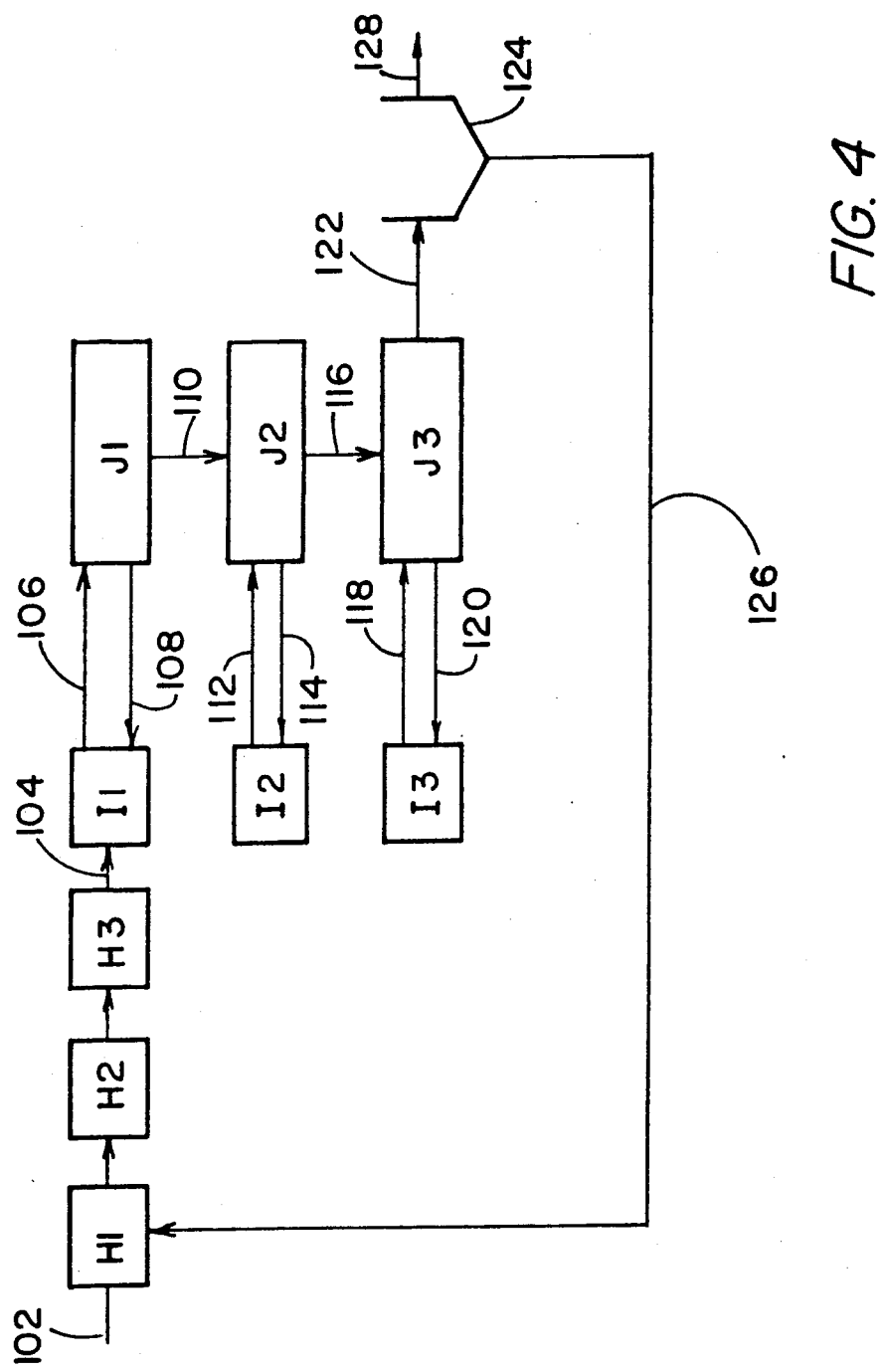
FIG. 4 is a flow scheme schematic showing the basic process of FIG. 2 modified to include a preceding anaerobic treatment stage.

FIG. 4 is a flow schematic illustrating another embodiment of the present invention. The flow schematic of FIG. 4 is similar to the flow schematic of FIG. 3 except that the flow schematic of FIG. 4 is a further modification of the basic nitrogen removal process shown in FIG. 2.

In FIG. 4, it is seen that wastewater influent enters the process through line 102. Line 102 is directed into a series of anaerobic treatment zones H1, H2 and H3. From the final anaerobic treatment zone H3, the mixed liquor passes through line 104 and enters a first anoxic zone I1. Mixed liquor entering treatment zone I1 is transferred to aerobic treatment zone J1 via line 106. Internal recycle back to anoxic zone I1 is provided through line 108. As with the other embodiment of the present invention, anoxic zone I1 and aerobic J1 comprise the first nitrogen removal stage.

Mixed liquor from the first nitrogen removal stage is transferred from zone J1 to aerobic zone J2 via line 110. Mixed liquor is transferred back and forth between aerobic zone J2 and anoxic zone I2 through lines 112 and 114. Likewise, the mixed liquor of the second nitrogen removal stage is transferred from aerobic zone J2 to aerobic zone J3 via line 116 where the same mixed liquor is transferred back and forth to a third anoxic zone I3 via lines 118 and 120. Finally, the mixed liquor from aerobic zone J3 is passed through line 122 into a final clarifier 124 that effectuates the separation of sludge from purifier supernatant. Sludge is directed from the final clarifier 124 through line 126 and is returned to line 102 where the same is mixed with wastewater influent to form mixed liquor. The purified supernatant is dispersed through line 128. Basically, phosphorus and nitrogen are removed by the process exemplified in FIG. 4 in the same manner as previously described.

EXAMPLE 1

The activated sludge process according to the present invention was demonstrated by a pilot plant study. The system employed was the third embodiment shown in FIG. 3. The operating conditions maintained during the test are shown in Table 1.

TABLE I

| OPERATING CONDITIONS | |
|---|---|
| Influent Flow (gpm) | 1.0 |
| Total HRT (hrs) | 11.0 |
| Anaerobic HRT (hrs) | 1.4 |
| Anoxic HRT (hrs) | 1.4 |
| Aerobic HRT (hrs) | 8.2 |
| Oxic SRT (days) | 8.9 |
| Total SRT (days) | 12.0 |
| Internal Recycles (gpm) | 1.5 |
| RAS Recycle (gpm) | 1.0 |
| MLSS (mg/l) | 2706 |
| Temp. (°C.) | 14.9 |
| Influent pH | 7.0 |
| Effluent pH | 7.2 |
| Influent Alkalinity (mg/l CaCO$_3$) | 103 |
| Effluent Alkalinity (mg/l CaCO$_3$) | 68 |

ABBREVIATIONS

HRT—Hydraulic Retention time
SRT—Sludge Retention Time
RAS—Return Activated Sludge
MLSS—Mixed Liquor Suspended Solids With regard to the hydraulic retention time, the total anaerobic retention time was 1.4 hours. This time was equally divided between each anaerobic cell. Similarly, the total anoxic time was 1.4 hours and was equally divided between the anoxic zones F1–F3. The total aerobic time was 8.2 hours and was equally divided between the aerobic zones G1–G3. The figures shown in Table I represent average figures over a thirteen day period. The performance of the pilot test is summarized in Table II.

TABLE II

| | PERFORMANCE RESULTS | | |
|---|---|---|---|
| | Influent | Effluent | % Removal |
| TSS | 83 | 13 | 84 |
| BOD$_5$ | 81 | 19 | 77 |
| COD | 300 | 122 | 59 |
| NH$_3$ | 12.2 | 0.8 | 93 |
| NO$_x$ | 0.5 | 2.5 | N/A |
| TKN | 23.1 | 2.2 | 90 |
| TN | 23.6 | 4.7 | 80 |
| TOTAL - P | 3.1 | 0.3 | 90 |
| ORTHO - P | 1.7 | 0.2 | 90 |

The pilot plant obtained excellent removal efficiencies for BOD, nitrogen and phosphorus. In addition, the settleability of the sludge was excellent as indicated by a SVI of 119.

EXAMPLE II

In a second test, the plant configuration illustrated in FIG. 4 was tested. The operating conditions of the second test are shown in Table 3.

TABLE III

| OPERATING CONDITIONS | |
|---|---|
| Influent Flow (gpm) | 1.0 |
| Total HRT (hrs) | 11.0 |
| Anaerobic HRT (hrs) | 1.4 |
| Anoxic HRT (hrs) | 1.4 |
| Aerobic HRT (hrs) | 8.2 |
| Oxic SRT (Days) | 10.9 |
| Total SRT (Days) | 14.0 |
| Internal Recycles (gpm) | 1.0 |
| RAS Recycle (gpm) | 0.5 |
| MLSS (mg/l) | 2993 |
| Temp. (°C.) | 10.6 |

TABLE III-continued

| OPERATING CONDITIONS | |
|---|---|
| Influent pH | 7.1 |
| Effluent pH | 7.1 |
| Influent Alkalinity (mg/l CaCO$_3$) | 110 |
| Effluent Alkalinity (mg/l CaCO$_3$) | 62 |

Results of the second test are summarized in table four below. As with the first test, excellent removal efficiencies of BOD, nitrogen and phosphorus were achieved.

TABLE IV

| | PERFORMANCE RESULTS | | |
|---|---|---|---|
| | Influent | Effluent | % Removal |
| TSS | 58 | 5 | 92 |
| BOD$_5$ | 88 | 4 | 95 |
| COD | 209 | 45 | 78 |
| NH$_3$ | 13.1 | 1.4 | 89 |
| NO$_x$ | 0.1 | 2.6 | N/A |
| TKN | 17.9 | 1.7 | 91 |
| TN | 18.0 | 4.3 | 76 |
| TOTAL - P | 3.1 | 0.5 | 85 |
| ORTHO - P | 1.8 | 0.2 | 91 |

The present invention offers significant advantages over prior art systems. The present invention accomplishes in one system high nitrogen compound removal efficiency at high reaction rates. The total tank volume required is comparable to that of a conventional activated sludge system. Therefore, conventional activated sludge systems can be upgraded to incorporate the present invention at relatively low capital costs. Additionally, the present invention requires no chemical addition and relatively low energy input. Thus, the present invention provides one of the most cost effective methods for treating wastewater without sacrificing removal efficiencies.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:
1. An activated sludge process for biologically removing BOD and nitrogen from wastewater comprising the steps of:
 (a) forming mixed liquor;
 (b) transferring the mixed liquor through a first nitrogen removal stage by directing the mixed liquor into and through first anoxic and aerobic treatment zones including maintaining the mixed liquor under anoxic conditions within the first treatment zone for a specified period to permit denitrifying organisms to reduce a portion of the nitrates and nitrites present in the mixed liquor to elemental nitrogen, transferring a portion of the mixed liquor from the first anoxic zone to the first aerobic zone and aerating the mixed liquor for a sufficient time period for nitrifying organisms to convert a portion of the ammonia and organic nitrogen in the mixed liquor into nitrates and nitrites, and circulating the mixed liquor back and forth between the first anoxic zone and the first aerobic zone of the first nitrogen re- moval stage to effectuate denitrification and nitrification;

(c) transferring mixed liquor from the first nitrogen removal stage to a second nitrogen removal stage having a second anoxic zone and a second aerobic zone, and circulating the mixed liquor back and forth between the second anoxic zone and the second aerobic zone of the second stage to effectuate further denitrification and nitrification;

(d) transferring the mixed liquor treated in the first and second nitrogen removal stages to a final clarifier where settled sludge is separated from purified supernatant; and (e) recycling at least a portion of the settled sludge to form the mixed liquor.

2. The activated sludge process according to claim 1 wherein the step of transferring the mixed liquor through a plurality of nitrogen removal stages includes first introducing the mixed liquor into the anoxic zone in each nitrogen removal stage.

3. The activated sludge process according to claim 2 wherein the step of transferring mixed liquor from one nitrogen removal stage to the next nitrogen removal stage includes transferring the mixed liquor from the first anoxic zone to the second anoxic zone.

4. The activated sludge process according to claim 3 wherein the first aerobic zone in the first nitrogen removal stage is disposed in a closed circulation mode so that mixed liquor transferred from the first anoxic zone to the first aerobic zone is recycled back to the first anoxic zone before being transferred to the second nitrogen removal stage.

5. The activated sludge process according to claim 1 wherein the mixed liquor is transferred through a plurality of nitrogen removal stages and the process includes initially introducing the mixed liquor into the first anoxic zone of the first nitrogen removal stage, and for each subsequent nitrogen removal stage, first introducing the mixed liquor into the aerobic zone.

6. The activated sludge process according to claim 5 wherein the step of transferring the mixed liquor from one nitrogen removal stage to the next nitrogen removal stage includes transferring the mixed liquor from an aerobic zone of a preceding nitrogen removal stage to an aerobic zone of a subsequent nitrogen removal stage.

7. The activated sludge process according to claim 6 wherein the anoxic zone in each nitrogen removal stage, except the first nitrogen removal stage is disposed in a closed loop so that mixed liquor transferred from the aerobic zone to the anoxic zone of a nitrogen removal stage is recycled back to the aerobic zone before proceeding to the next stage.

8. The activated sludge process according to claim 1 further including treating the mixed liquor in an anaerobic zone before transferring the mixed liquor to the first nitrogen removal stage and maintaining the mixed liquor in said anaerobic zone for a sufficient period to effect selection of phosphate storing organisms.

9. The activated sludge process according to claim 8 wherein the anaerobic zone comprises a plurality of hydraulically distinct sections.

10. The process according to claim 1 wherein the recycle from one zone to another in each nitrogen removal stage is 100%–200% of the wastewater influent to the process.

11. The activated sludge process of claim 1 including the step of adding methanol to at least one of the anoxic treatment zones.

12. The method of claim 1 including the step of adding a fermented product to the process.

13. The method of claim 12 including the step of adding the fermented product to the first anoxic zone of the first nitrogen removal stage.

14. The method of claim 1 wherein in recycling the mixed liquor back and forth between anoxic and oxic zones, the mixed liquor is recycled from an oxic zone to an anoxic zone and wherein the method includes holding the mixed liquor being recycled from at least one oxic zone in an exhauster holding tank for a selected time period and exhausting the dissolved oxygen associated with the mixed liquor before the mixed liquor is returned to the anoxic zone.

15. The method of claim 14 including the step of holding the mixed liquor in the dissolved oxygen exhauster holding tank for a time period sufficient to reduce the dissolved oxygen level of the mixed liquor therein to below 0.6 ppm.

16. The method of claim 1 wherein the formed mixed liquor includes BOD and wherein the method includes a step of averting the complete depletion of BOD from the mixed liquor during treatment in the first nitrogen removal stage by passing mixed liquor containing BOD from the first nitrogen removal stage to the second nitrogen removal stage and utilizing BOD that has passed through the first nitrogen removal stage in the anoxic zone of the second nitrogen removal stage to effectuate further denitrification.

17. The method of claim 16 including the step of transferring the BOD containing mixed liquor into the anoxic stage of the first nitrogen removal stage and transferring BOD containing mixed liquor from the first anoxic zone to the second anoxic zone before the BOD associated with the mixed liquor is depleted, thereby providing for the use of BOD in the second anoxic zone to effectuate denitrification.

18. The method of claim 1 wherein the formed mixed liquor is first introduced into the anoxic zone of the first nitrogen removal stage.

19. The method of claim 1 wherein the formed mixed liquor is first introduced into the aerobic zone of the first nitrogen removal stage.

20. An activated sludge process for biologically removing BOD and nitrogen from wastewater comprising the steps of:

(a) forming mixed liquor;

(b) transferring the mixed liquor through a plurality of nitrogen removal stages by directing the mixed liquor into a first anoxic zone of a first nitrogen removal stage and maintaining the mixed liquor under anoxic conditions for a specified period to permit denitrifying organisms to reduce a portion of the nitrates and nitrites present in the mixed liquor to elemental nitrogen, transferring a portion of the mixed liquor from the first anoxic zone to a first aerobic zone in the first nitrogen removal stage and aerating the mixed liquor for a sufficient time period for nitrifying organisms to convert a portion of the ammonia and organic nitrogen in the mixed liquor into nitrates and nitrites, and recycling the mixed liquor back and forth between the first anoxic zone and the first aerobic zone of the first nitrogen removal stage to effectuate denitrification and nitrification;

(c) transferring mixed liquor from the first anoxic zone to a second anoxic zone of a second nitrogen removal stage and denitrifying the mixed liquor, transferring the mixed liquor from the second anoxic zone to a second aerobic zone and nitrifying the mixed liquor within the second aerobic zone, and recycling the mixed liquor back and forth between the second anoxic zone and the second aerobic zone of the second stage to effectuate further denitrification and nitrification;

(d) transferring the mixed liquor treated in the first and second nitrogen removal stages to a final clarifier where settled sludge is separated from purified supernatant; and (e) recycling at least a portion of the settled sludge to form the mixed liquor.

21. An activated sludge process for biologically removing BOD and nitrogen from wastewater comprising the steps of:

(a) forming mixed liquor;

(b) transferring the mixed liquor through a series of nitrogen removal stages by directing the mixed liquor into a first anoxic zone of a first nitrogen removal stage and maintaining the mixed liquor under anoxic conditions for a specified period to permit denitrifying organisms to reduce a portion of the nitrates and nitrites present in the mixed liquor to elemental nitrogen, transferring a portion of the mixed liquor from the first anoxic zone to a first aerobic zone within the first nitrogen removal stage and aerating the mixed liquor for a sufficient time period for nitrifying organisms to convert a portion of the ammonia and organic nitrogen in the mixed liquor into nitrates and nitrites, and recycling the mixed liquor back and forth between the first anoxic zone and the first aerobic zone of the first nitrogen removal stage to effectuate denitrification and nitrification;

(c) transferring mixed liquor from the first aerobic zone to a second aerobic zone of a second nitrogen removal stage and nitrifying the mixed liquor therein, transferring the mixed liquor from the second aerobic zone to a second anoxic zone within the second nitrogen removal zone and denitrifying the mixed liquor in the second anoxic zone, and recycling the mixed liquor back and forth between the second aerobic zone and the second anoxic zone of the second stage to effectuate further nitrification and denitrification;

(d) transferring the mixed liquor treated in the first and second nitrogen removal stages to a final clarifier where settled sludge is separated from purified supernatant; and (e) recycling at least a portion of the settled sludge to form the mixed liquor.

* * * * *